United States Patent [19]

Filippone et al.

[11] Patent Number: 5,069,884

[45] Date of Patent: Dec. 3, 1991

[54] PROCESS FOR THE PURIFICATION OF AN AQUEOUS ALKALI METAL CHLORIDE SOLUTION FROM AMMONIUM AND IODINE COMPOUNDS

[75] Inventors: Mauro Filippone, Rosignano-Castiglioncello; Carlo Lessi, Rosignano-Marittimo, both of Italy

[73] Assignee: Solvay & Cie (Societe Anonyme), Brussels, Belgium

[21] Appl. No.: 520,526

[22] Filed: May 8, 1990

[30] Foreign Application Priority Data

May 15, 1989 [IT] Italy ............................ 20504 A/89

[51] Int. Cl.⁵ .................... C01B 7/14; C01D 3/06
[52] U.S. Cl. ..................... 423/181; 423/499; 423/501; 423/504; 210/754
[58] Field of Search ............... 423/499, 181, 191, 194, 423/197, 501, 504; 210/754, 758, 903

[56] References Cited

U.S. PATENT DOCUMENTS

| | | | |
|---|---|---|---|
| 1,861,763 | 6/1932 | Terziev | 423/191 |
| 3,174,828 | 3/1965 | Hein | 423/501 |
| 3,346,331 | 10/1967 | Nakamura et al. | 423/501* |
| 4,131,645 | 12/1978 | Keblys et al. | 423/210 |

FOREIGN PATENT DOCUMENTS 674933 11/1966 Belgium.
1154202 5/1985 U.S.S.R. ............................ 423/501

OTHER PUBLICATIONS

Delayed Belgian Report, General Inorganic, FTC-p. 1, No. 28/66, Abstract of BE-674933.
Chemical Abstracts, vol. 42, No. 3, 10 fevrier 1948, colonne 1030i, Columbus Ohio, US; E. Urion et al.: "Purification of Brines Contaminated with Ammonia", & Chimie & Industrie 58, 348 (1947).
Chemical Abstracts, vol. 92, No. 8, 8 Fevrier 1980, p. 138, Resume No. 61134t, Columbus, Ohio, US; & JP-A-79 24 995 (Mitsui Toatsu Chemicals, Inc.), 24-0-8-1979.

Primary Examiner—Michael Lewis
Assistant Examiner—Brian M. Bolam
Attorney, Agent, or Firm—Willian Brinks Olds Hofer Gilson & Lione

[57] ABSTRACT

Process for the purification of an aqueous alkali metal chloride solution from iodine compounds and ammonium compounds, in which the operation is carried out in two successive stages comprising a first stage in which the iodine compounds are oxidized to molecular iodine which is removed from the solution on a halogenated basic anion exchange resin, and a second stage in which the ammonium compounds are oxidized to form nitrogen which is removed in a stream of inert gas.

10 Claims, 1 Drawing Sheet

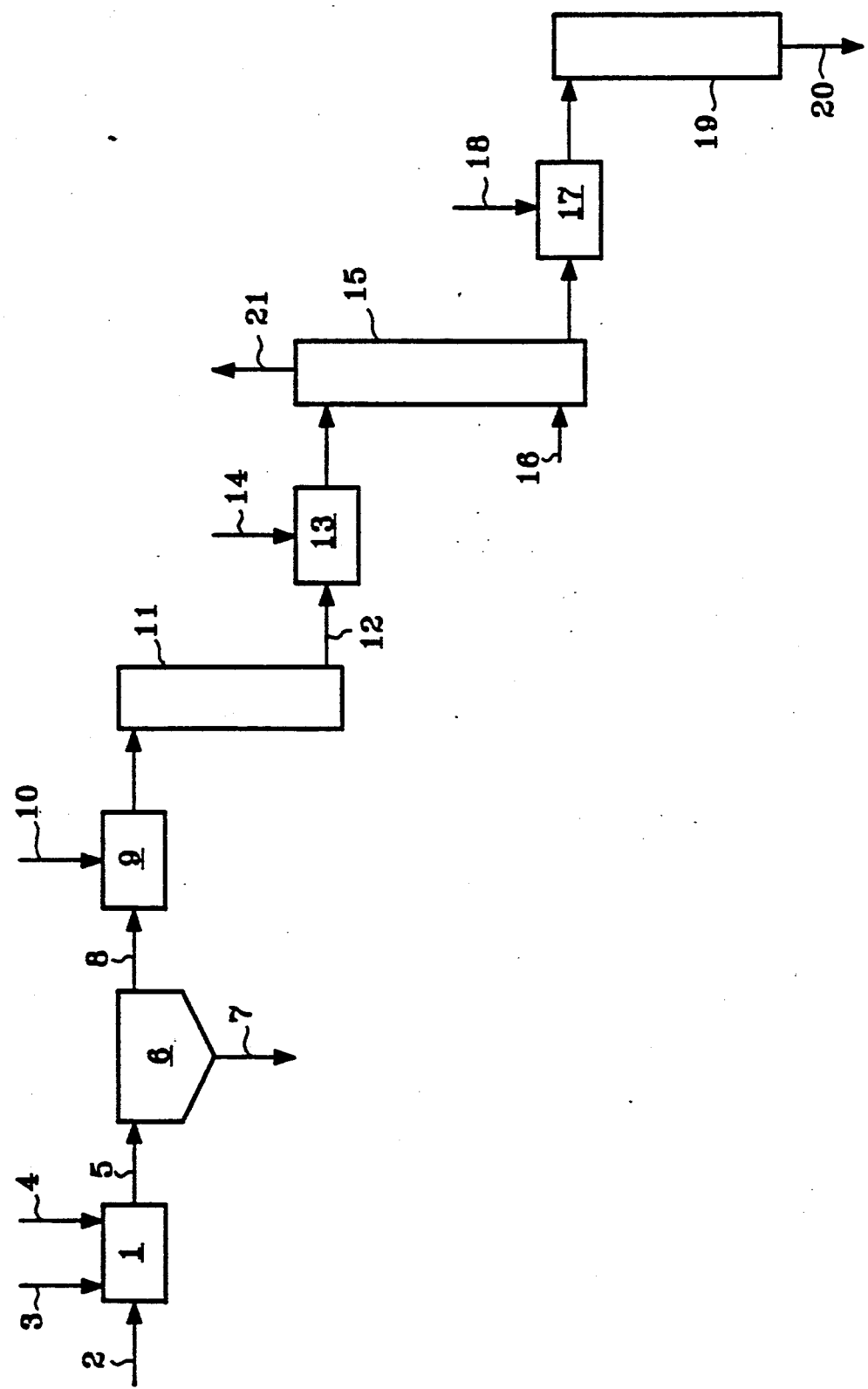

PROCESS FOR THE PURIFICATION OF AN AQUEOUS ALKALI METAL CHLORIDE SOLUTION FROM AMMONIUM AND IODINE COMPOUNDS

The invention relates to the purification of aqueous alkali metal chloride solutions such as sodium chloride brines.

It relates more particularly to a process for the purification of an aqueous alkali metal chloride solution from ammonium and iodine compounds.

Aqueous sodium chloride solutions obtained from seawater or by dissolving rock salt in water contain various impurities, which include especially calcium, magnesium, iron and ammonium compounds (aqueous ammonia, ammonium chloride), iodine compounds (metal iodides) and bromine compounds (metal bromides). These impurities are harmful when the sodium chloride solutions are treated in electrolysis cells to produce chlorine and sodium hydroxide. In particular, ammonium compounds, iodine compounds and bromine compounds then form nitrogen trichloride, iodine and bromine, which enter the chlorine and contaminate. Furthermore, the presence of iodide ions in aqueous sodium chloride solutions has been found to be a cause of a loss of efficiency of electrolysis cells containing cation exchange membranes employed for the production of chlorine and of aqueous sodium hydroxide solutions.

Document Belgian Patent 674,933 (Societa Chimica dell'Aniene), describes a process for the purification of brines from ammonium compounds, iodine compounds and bromine compounds, according to which sodium hypochlorite is added to the brine in a sufficient quantity to oxidize all the ammonium, iodine and bromine compounds and to form nitrogen, iodine and bromine, the aqueous solution is then subjected to a purge by means of a stream of air to entrain the nitrogen, and it is then brought into contact with a basic, halogenated ion exchange resin to remove iodine and bromine. This known process produces a very good purification from ammonium and bromine compounds but the purification from iodine compounds has been found mediocre and generally inadequate in the case of aqueous solutions intended for electrolysis cells fitted with cation exchange membranes.

It has now been found that it is possible to overcome this disadvantage of the known process described above, by suitably modifying the order of performance of its various stages.

Consequently, the invention relates to a process for the purification of an aqueous alkali metal chloride solution from iodine compounds and from ammonium compounds, in which the iodine compounds and the ammonium compounds are oxidized and the iodine and nitrogen which are produced are removed, respectively, on a halogenated basic anion exchange resin and in a stream of inert gas; according to the invention, the operation is carried out in two successive stages comprising a first stage in which the iodine compounds are oxidized and the resulting alkali metal chloride solution is then treated on the resin and a second stage in which the ammonium compounds are oxidized and the resulting alkali metal chloride solution is then subjected to the stream of inert gas.

In the process according to the invention the ammonium and iodine compounds comprise aqueous ammonia, ammonium chloride and metal, especially alkali metal, iodides. They are naturally present in seawater or rock salt when the aqueous solution of alkali metal is an aqueous sodium chloride solution.

The oxidation of the iodine compounds is preferably carried out using active chlorine, generally in acidic medium. Chlorine or alkali metal hypochlorite may be employed for this purpose. Sodium hypochlorite is preferred. The oxidation is controlled so as to decompose the iodine compounds and to form molecular iodine; it is expressly appropriate to avoid an excessive oxidation leading to the formation of $IO_3^-$. This condition is imposed because $IO_3^-$ anions are not adsorbed on the anion exchange resin employed in the process. To this end, the oxidation may, for example, be followed and accurately controlled using a measurement of the redox potential of the reaction mixture.

After the iodine compounds have been oxidized to molecular iodine, the aqueous solution is brought into contact with the anion exchange resin, so as to make the iodine adsorb onto the resin. The anionic resin is a basic resin comprising fixed cationic sites and interchangeable anionic sites, occupied by halogen anions, such as $BR^-$, $Cl^-$ and $I^-$. Anion exchange resins which can be employed in the process according to the invention are those in which the fixed cationic sites are quaternary ammonium groups attached to long-chain polymers such as copolymers of styrene and divinylbenzene. Resins of this type are described in U.S. Pat. Nos. 2,591,573, 2,597,440, 2,597,494, 2,614,099, 2,630,427 and 2,900,352. Amberlite resins (Rohm & Haas Co) are suitable, in particular the varieties known in the trade under the trademarks Amberlite IRA-400, Dowex-1, Duolite A-42, Nalcite SBR and Permutite S-1. The resin is generally in the form of granules, in contact with which the aqueous sodium chloride solution is circulated. The resin employed in the process according to the invention must have its interchangeable sites occupied by halogen anions. Chloride and iodide anions are preferred. The adsorption of free iodine from the solution onto the resin takes place with formation of polyhalogenated complexes, probably according to the following reaction:

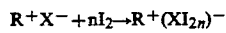

in which $I_2$ denotes molecular iodine from the aqueous solution, $R^+$ denotes a fixed cationic site of the resin, $X^-$ denotes a halide ion occupying an interchangeable anionic site of the resin (for example an $I^-$ or $Cl^-$ ion).

The resin must be regenerated at regular intervals when its sites are saturated with the $(XI_{2n})^-$ anions. The regeneration can be obtained by washing the resin with a solvent in which iodine is more soluble than water, for example an alcohol, or with an iodine reagent. Additional information on the resin and its use is available in Patent GB-A-893,692.

The aqueous solution collected at the end of the treatment on the anion exchange resin is then subjected to the second stage of the process according to the invention. In this, the oxidation of the ammonium compounds is also preferably carried out by means of active chlorine, generally in acidic medium, for example by means of a stream of chlorine or of alkali metal hypochlorite. Sodium hypochlorite is preferred. The oxidation is controlled so as to decompose the ammonium compounds and to liberate nitrogen, for example according to the reactions:

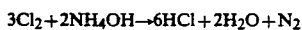

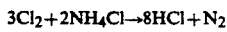

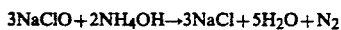

At the end of the oxidation treatment the nitrogen is removed from the aqueous solution in a stream of inert gas. Inert gas is intended to mean a gas which does not react with the constituents of the aqueous solution and which does not constitute a harmful impurity for the application for which the solution is intended. Examples of inert gases which may be employed in the process according to the invention are oxygen, air, argon and steam. Air is preferred. Individual features and details concerning the second stage of the process are available in Patents U.S. Pat. No. 1,861,763 and BE-A-674,933.

The process according to the invention is preferably applied to aqueous solutions which have been purified from calcium and magnesium beforehand. To this end, the first stage of the process of the invention may be preceded by a treatment of the solution with sodium carbonate and sodium hydroxide, as is well known in the art (J. S. Sconce - Chlorine, Its manufacture, Properties and Uses - Reinhold Publishing Corporation - 1962 - Pages 135 and 136).

In a particular embodiment of a process according to the invention the aqueous sodium chloride solution is subjected to a debromination stage, in addition to the abovementioned two stages. The purpose of the debromination stage is to purify the aqueous solution from bromine compounds by removing the bromide ions which it contains. According to the invention, the debromination stage follows the abovementioned first stage and comprises an oxidation of the bromine compounds in the solution to bromine, followed by a treatment of the resulting solution on a halogenated basic anion exchange resin. In this embodiment of the process according to the invention, the oxidation of the bromine compounds and the subsequent treatment of the aqueous solution on the anion exchange resin may be carried out in a manner similar to the first stage of the process, which is described above. To this end, the oxidation is preferably carried out with active chlorine in acidic medium, for example by means of gaseous chlorine or alkali metal hypochlorite, sodium hypochlorite being the preferred oxidizing agent. The oxidation must be controlled to decompose the bromine compounds and to form molecular bromine, while expressly avoiding an excessive oxidation leading to the formation of $BrO_3^-$ anions. The resin is of the type of those described above with reference to the first stage of the process. In this particular embodiment of the process according to the invention, the debromination stage may follow the abovementioned second stage or may be inserted between the first stage and the second stage.

In the process according to the invention, the pH of the aqueous solution constitutes a parameter which is of importance for the efficiency of purification. To this end, according to another embodiment of the process according to the invention, it has been found especially advantageous to carry out each of the stages of the process in acidic medium, the pH being lower than 3 in the first stage and higher than 2 in the second stage.

Preferred pH values are those between 0.5 and 3 in the first stage, between 2 and 6 in the second stage and, if appropriate, between 1 and 6 in the debromination stage. The optimum pH values at each stage of the process depend on the operating conditions and can be readily determined by routine laboratory tests.

The invention finds an advantageous application for the purification of aqueous sodium chloride solutions intended for the manufacture of sodium carbonate by the aqueous ammonia process, and for the production of chlorine and sodium hydroxide by electrolysis.

Particular features and details of the invention will emerge from the following description of the single figure of the attached drawing, which shows the diagram of a particular embodiment of the process according to the invention.

BRIEF DESCRIPTION OF THE DRAWING

The figure is a diagram of the process according to the present invention.

The plan shown diagrammatically in the figure is intended to purify an aqueous sodium chloride solution contaminated with calcium and magnesium compounds ($CaCl_2$, $MgCl_2$), ammonium compounds ($NH_4OH$, $NH_4Cl$) and bromine and iodine compounds (sodium, calcium and magnesium iodides). It comprises a reaction chamber 1 in which the aqueous sodium chloride solution 2 is treated with sodium carbonate 3 and with sodium hydroxide 4 to precipitate the calcium and magnesium ions as calcium carbonate and magnesium hydroxide The aqueous suspension 5 collected from the reaction chamber 1 is transferred to a settling chamber 6, to separate off the precipitate 7 of calcium carbonate and magnesium hydroxide. An aqueous sodium chloride solution 8 is collected from the settling chamber 6 and is introduced into the reaction chamber 9; in the latter the solution is acidified to a suitable pH and treated by the addition of an aqueous sodium hypochlorite solution 10 to oxidize the iodide ions to molecular iodine. The quantity of sodium hypochlorite employed is controlled by a measurement of the redox potential of the reaction mixture so as to produce a substantially complete oxidation of the iodide anions $I^-$ to iodine while avoiding the formation of iodate anions $IO_3^-$. The aqueous sodium chloride solution is then introduced into a column 11 filled with beads of an anion exchange resin whose interchangeable sites are saturated with halogen anions ($I^-$, $Br^-$, $Cl^-$). In the column the solution percolates through the resin and the iodine is progressively adsorbed on the latter. The aqueous sodium chloride solution 12 collected at the foot of the column 11 is conveyed to a reactor 13 where, after pH adjustment, an aqueous sodium hypochlorite solution 14 is added to it in a sufficient quantity to decompose the ammonium compounds and to liberate nitrogen On leaving the reactor 13 the aqueous solution is introduced into the top of a column 15 fed with a stream of air 16 at the base. In the column 15 the aqueous solution is subjected to scrubbing by the current of air which thus entrains the nitrogen out of the solution. The nitrogen-charged air (21) escapes at the head of the column 15. The aqueous solution run off at the foot of the column 15 is introduced into an additional reactor 17, where an aqueous sodium hypochlorite solution 18 is added to it in a quantity adjusted so as to oxidize the bromide ions to molecular bromine while avoiding the formation of complex bromate anions $BrO_3^-$. The solution leaving the reactor 17 is introduced into a column 19 where it is percolated through a basic anion exchange resin whose interchangeable sites are occupied by halogen anions. The bromine of the brine is thus adsorbed onto the resin and an aqueous sodium chloride solution 20 of high purity is collected at the foot of the column.

The following examples serve to illustrate the invention.

The examples deal with tests in which the aqueous solutions used were substantially saturated in sodium chloride (approximately 300 g of sodium chloride per liter of solution) and purified from calcium and magnesium in the usual manner beforehand.

First series of examples (in accordance with the invention)

Examples 1 to 3, which follow, relate to tests in which aqueous sodium chloride solutions were subjected to a purification process in accordance with the invention. To this end, they were treated in a plant of the type of that described above with reference to the attached drawing, where they were subjected successively to:
- a stage of purification from iodine,
- a stage of purification from aqueous ammonia,
- a stage of purification from bromine.

EXAMPLE 1

An aqueous solution containing the following impurities was used:
- bromide ions : 54 mg/l,
- bromate ions : <0.2 mg/l,
- iodide ions : 2.9 mg/l,
- ammonium ions: 28 mg/l (expressed as $NH_3$).

A solution flow rate of 10 l/h was employed.

In the stage of purification from iodine the aqueous solution was brought to an acidic pH and was treated with a stream of chlorine whose flow rate was adjusted to a suitable value for oxidizing all the iodide ions to iodine while avoiding the formation of iodate anions. The control of the flow rate of chlorine was carried out using a measurement of the redox potential of the reaction mixture, as explained above. The aqueous solution was then treated on an Amberlite IRA-400 (Rohm & Haas) anion exchange resin. The iodine content of the aqueous solution leaving the resin was 0.5 mg/l.

The aqueous solution was then subjected to the stage of purification from aqueous ammonia. In this stage it was treated with a stream of chlorine whose flow rate was controlled using a measurement of the redox potential at a sufficient value to oxidize all the ammonium cations while liberating nitrogen The aqueous solution was then subjected to a scrubbing with an upward stream of air at a flow rate of 200 l/h. An ammonium ion content (expressed in mg of $NH_4$) of less than 0.2 mg/l was measured in the solution collected at the foot of the column.

In the stage of purification of bromine the aqueous solution was treated with a stream of chlorine whose flow rate was controlled using a measurement of the redox potential at a suitable value for completing the oxidation of the bromide ions to bromine while avoiding forming bromate anions. The aqueous solution was then treated on an Amberlite IRA-400 (Rohm & Haas) anion exchange resin. The aqueous solution collected at the exit from the resin contained, per liter:
- 0.5 mg of iodine,
- <0.2 mg of ammonia
- 3 mg of bromine.

EXAMPLE 2

The test of Example 1 was repeated with an aqueous sodium chloride solution containing the following impurities:
- bromide ions: 50 mg/l
- bromate ions: <0.2 mg/l,
- iodide ions : 2.5 mg/l,
- ammonium ions: 28 mg/l (expressed as $NH_3$).

A flow rate of 10 liters of the solution per hour was used when performing the test. At the end of the three purification stages, performed as described in Example 1, an aqueous sodium chloride solution was collected, containing per liter:
- 0.2 mg of iodine,
- 0.5 mg of ammonia,
- 0.5 mg of total nitrogen expressed as $NH_3$,
- 0.6 mg of bromine,
- 0.5 mg of bromate ions.

EXAMPLE 3

The test of Example 1 was repeated with an aqueous sodium chloride solution containing the following impurities:
- bromide ions : 48 mg/l,
- bromate ions : 0.3 mg/l,
- iodide ions : 2.9 mg/l,
- ammonium ions 27 mg/l (expressed as $NH_3$).

A flow rate of 30 liters of solution per hour was used when performing the test. At the end of the three purification stages, carried out as described in Example 1, an aqueous sodium chloride solution was collected, containing per liter:
- 0.3 mg of iodine,
- 0.7 mg of ammonia,
- 0.4 mg of bromine,
- 0.1 mg of bromate ions.

Second Series of Examples (reference examples)

Examples 4 to 6, whose description follows, relate to tests in which the three purification stages were performed in the following order:
(1) : step of purification from aqueous ammonia,
(2) : stage of purification from iodine,
(3) : stage of purification from bromine.

EXAMPLE 4

The aqueous solution, saturated with sodium, chloride and purified beforehand from calcium and magnesium, contained the following impurities:
- bromide ions: 48 mg/l,
- bromate ions: 0.3 mg/l,
- iodide ions: 2.9 mg/l,
- ammonium ions: 27 mg/l (expressed as $NH_3$).

An hourly flow rate of 10 liters of solution was used.

The stage of purification from aqueous ammonia was performed as in the tests of Examples 1 to 3, the flow rate of scrubbing air being equal to 200 l/h. The stages of purification from iodine and bromine were performed as in the tests relating to Examples 1 to 3.

At the end of the test a sodium chloride solution was collected containing:
- 0.7 mg of ammonia,
- 0.2 mg of bromine,
- 0.1 mg of bromate ions,
- 2.3 mg of iodine.

EXAMPLE 5

The test of Example 4 was repeated with an aqueous sodium chloride solution containing the following impurities:
bromide ions 55 mg/l,
iodide ions 3 mg/l,
ammonium ions: 31 mg/l (expressed as $NH_3$).
The hourly flow rate of the solution was 20 liters.
At the end of the test a sodium chloride solution was collected containing:
0.9 mg of bromine,
2.8 mg of iodine.

EXAMPLE 6

The test of Example 4 was repeated with an aqueous sodium chloride solution containing the following impurities:
bromide ions: 48 mg/l
iodide ions : 2.9 mg/l
ammonium ions: 27 mg/l (expressed as $NH_3$).
The hourly flow rate of the solution was 10 liters.
The stage of purification from aqueous ammonia was performed as in the tests of Examples 1 to 5, but the purification from iodine and the purification from bromine were performed simultaneously in a single stage which followed the stage of purification from ammonia.
At the end of the test a sodium chloride solution was collected containing:
0.4 mg of bromine,
2.4 mg of iodine.

A comparison of the results of Examples 1 to 3 (in accordance with the invention) with those of Examples 4 to 6 (reference) shows the progress contributed by the invention insofar as the efficiency of purification from iodine is concerned.

We claim:

1. Process for the purification of an aqueous alkali metal chloride solution from iodine compounds and from ammonium compounds, in which the iodine compounds and the ammonium compounds are oxidized and the iodine and nitrogen which are produced are removed, respectively, on a halogenated basic anion exchange resin and in a stream of inert gas, characterized in that the operation is carried out in two successive stages comprising a first stage in which the iodine compounds are oxidized and the resulting alkali metal chloride solution is then treated on the resin and a second stage in which the ammonium compounds are oxidized and the resulting alkali metal chloride solution is then subjected to the stream of inert gas and the pH of the alkali metal chloride solution is controlled below 3 in the first stage and above 2 in the second stage.

2. Process according to claim 1, characterized in that the alkali metal chloride solution is treated with active chlorine in acidic medium to oxidize the iodine compounds and the ammonium compounds.

3. Process according to claim 2, characterized in that the active chlorine is used in the form of gaseous chlorine or of alkali metal hypochlorite.

4. Process according to claim 2, characterized in that the treatment of the aqueous solution with active chlorine is performed in conditions controlled so as to oxidize all of the iodide ions of the iodine compounds to molecular iodine in the first stage and all of the ammonium ions of the ammonium compounds to molecular nitrogen in the second stage.

5. Process according to claim 4, characterized in that the quantity of active chlorine used in each stage is controlled using a measurement of the redox potential of the aqueous alkali metal chloride solution.

6. Process according to claim 1, characterized in that the pH of the alkali metal chloride solution is controlled between 0.5 and 3 in the first stage and between 2 and 6 in the second stage.

7. Process according to claim 1, characterized in that the inert gas used in the second stage is air.

8. Process according to claim 1, characterized in that the anion exchange resin used in the first stage is an iodinated or chlorinated resin.

9. Process according to claim 1, characterized in that the alkali metal chloride solution is subjected to a debromination stage comprising an oxidation of bromine compounds of the solution to bromine and a treatment of the resulting solution on a halogenated basic anionic exchange resin, the debromination stage being subsequent to the above-mentioned first stage.

10. Process according to claim 1, characterized in that said aqueous alkali metal chloride solutions is purified of calcium and magnesium before introduction of said solution into said process.

* * * * *

UNITED STATES PATENT AND TRADEMARK OFFICE
CERTIFICATE OF CORRECTION

PATENT NO. : 5,069,884
DATED : December 3, 1991
INVENTOR(S) : Mauro Filippone et al It is certified that error appears in the above-identified patent and that said Letters Patent is hereby corrected as shown below:

Col. 4, line 32, after "droxide" insert --.--.

Col. 4. line 56, after "nitrogen" insert --.--.

Col. 5, line 17, after "invention)" insert --.--.

Col. 5, line 53, after "nitrogen" insert --.--.

Col. 5, line 56, change "$NH_4$" to --$NH_3$--.

Col. 6, line 50, change "sodium," to --sodium--.

Col. 8, line 43, change "solutions" to --solution--.

Signed and Sealed this

Third Day of August, 1993

Attest:

MICHAEL K. KIRK

*Attesting Officer*     Acting Commissioner of Patents and Trademarks